United States Patent

Marritt

[11] Patent Number: 5,871,572
[45] Date of Patent: Feb. 16, 1999

[54] AQUEOUS INK COMPOSITION FOR USE IN AN INK JET PRINTER

[75] Inventor: William Alan Marritt, Suwa, Japan

[73] Assignee: Seiko Epson Corporation, Shinjuku-Ku, Japan

[21] Appl. No.: 958,686

[22] Filed: Oct. 27, 1997

[30] Foreign Application Priority Data

Oct. 25, 1996 [JP] Japan .................................... 8-283908
Jun. 11, 1997 [JP] Japan .................................... 9-153435

[51] Int. Cl.$^6$ .................................................. C07D 11/14

[52] U.S. Cl. .................................... 106/31.36; 106/31.43; 106/31.58; 106/31.68; 106/31.75; 106/31.86

[58] Field of Search ............................. 106/31.36, 31.43, 106/31.58, 31.68, 31.75, 31.86

[56] References Cited

U.S. PATENT DOCUMENTS 5,133,803  7/1992  Moffatt .................................. 106/31.37
5,476,540  12/1995  Shields et al. ........................ 106/31.36

*Primary Examiner*—Helene Klemanski
*Attorney, Agent, or Firm*—Ladas & Parry

[57] ABSTRACT

An aqueous ink composition for ink jet printers, which gives reliable printing performance and yields printed images which have excellent print quality and which dry rapidly is disclosed. The ink compositions are suitable for printing on plain paper. The ink comprises water as the principal solvent, an anionic colorant, pectic acid, a base, and at least one of a penetrable solvent and/or a penetrability-imparting surfactant. The pectic acid is composed primarily of α-1,4 linked polygalacturonic acid having a degree of esterification not more than 5% where the degree of esterification is defined as the percentage of the total number of galacturonic acid units in the pectic acid which are esterified.

14 Claims, No Drawings

AQUEOUS INK COMPOSITION FOR USE IN AN INK JET PRINTER

BACKGROUND OF THE INVENTION

1. Field of the Invention

This invention relates to ink compositions suitable for ink jet printing.

2. Background Art

Ink jet printing is a non-impact printing process in which the printer produces droplets of ink in response to digital signals, such as those generated by a computer. The droplets of ink are deposited on a substrate such as paper or transparent films. Ink jet printers have found broad commercial acceptance due to their print quality, low cost, relatively quiet operation, and graphics capability. Thermal (bubble jet) and piezoelectric drop-on-demand printers have been especially successful in the marketplace and have found broad application as printers for personal computers in the office and the home.

Three major concerns dominate ink jet technology: (1) reliability, (2) print quality, and (3) drying rate. Typically, reliability is evaluated with respect to the following four criteria. The first is robustness with respect to continuous printing conditions such that the ink droplet weight does not change over time and good directionality is maintained. Good directionality means that the angular deviation of an ejected ink droplet from a nozzle is within about ±0.5° from the normal to the plane of the nozzle. The second is robustness with respect to intermittent printing conditions such that the nozzles do not clog over the time interval in which printing is discontinued. The third is robustness with respect to long term storage of the ink within the print head such that printing behavior unchanged from the original printing behavior (ink droplet weight and good directionality) can be restored after applying a limited amount of suction to the nozzles. The fourth is chemical and physical stability of the ink towards storage at two temperature extremes and towards cycling between those two temperature extremes for an extended period of time.

Print quality is typically defined in terms of two general factors: color properties and non-color image characteristics. Color properties of the ink are measured by optical density and the color coordinates which determine the hue. Non-color characteristics which determine the definition of an image are resolution (drops per unit area), the area coverage per drop, edge acuity or sharpness, and the extent of peripheral defects such as satellites (stray droplets around the perimeter of a printed character) or feathering.

A great concern with ink jet printing is the level of print quality, as defined by edge acuity or sharpness of an image and minimal feathering, which can be obtained on "plain paper." The term "plain paper" refers to a broad set of commercial papers, especially those available for use in electrographic copying. Such commercial papers do not rely on a unique structure, composition, or narrow set of properties such that only an ink jet printer can make best use of the paper's properties. In recent years there has been increasing demand for ink jet printers which provide excellent print quality on plain paper.

The drying rate of the ink is an important factor in determining the throughput rate of the printer. In a sheet fed printer, the ink on a printed sheet must be dry before the succeeding sheet contacts it. If the ink is not dry, smearing will occur. Drying occurs by both evaporation and penetration. The drying rate can be increased by using a water miscible cosolvent, which has a higher vapor pressure than water, and, thus, will evaporate faster than water. This approach may be disadvantageous because the cosolvent will also evaporate more rapidly from the nozzles of the print head, resulting in clogging during periods of non-use. The preferred approach is to use a water miscible cosolvent which increases the rate of penetration of the ink into the paper. The use of penetrants such as diethylene glycol mono-n-butyl ether, which lower the interfacial energy between the ink and the paper, is well known in the art.

The three major concerns discussed above are often incompatible. For example, as noted above, increasing the drying rate by using a cosolvent which has a higher vapor pressure than water, will adversely affect the reliability of the ink. Similarly, the use of penetrants is known to adversely affect the print quality of the ink on plain papers. Accordingly, there exists a need for ink compositions which will give reliable printing performance, dry rapidly, and yield printed images which have excellent print quality on plain paper.

One general approach which has been used to obtain improved print quality on plain paper is to include in the ink a gel-forming polymer which will gel when it comes in contact with a gel-initiating species. The formation of a gel results in reduced spreading of the ink droplet on the surface of the paper. Reduced spreading of the ink droplet leads to better edge acuity and reduced feathering.

In one method using this concept, the gel-initiating species is dissolved in a clear, dye-free liquid and then printed on the paper prior to the printing of the inks which contain the gel-forming polymer. In another method using this concept, one color of ink contains the gel-initiating species and another color of ink contains the gel-forming species. Using this method, significant improvements in print quality are only obtained when the two inks are printed on top of each other or adjacent to each other. In the ideal method using this concept, a gel-forming polymer is used which is capable of forming a gel in the presence of gel-initiating species which are contained in the compositions of typical plain papers. Examples of prior art which use the gel-forming polymer and gel-initiating species concept are given below.

In Japan Laid-Open Patent Application 01-203,483, an ink composition containing a water soluble dye, a polyhydric alcohol derivative, and pectin in the amount of 0.01 to 2 wt. % is described. The claimed advantages of the ink compositions are rapid drying and printed images on plain paper having good print quality. Additionally, good reliability of the ink and lightfast and waterfast print images are claimed.

In Japan Laid-Open Patent Application 04-190947, an ink set is described in which a first liquid containing a water soluble resin having at least one carboxylic acid group, carboxylic acid anhydride, or a sulfonic acid group is applied to a substrate followed by a second aqueous ink composition which contains a dye, an alkali-soluble resin, and an alkali. The pH of the first liquid is between 1 and 7, while the pH of the second liquid is between 7 and 12. Pectinic acid (a synonym for pectin) is used in one example of the invention as the carboxylic acid group containing water soluble resin of the first liquid. As an example of an alkali-soluble resin for use in the aqueous ink composition, pectin is given. The claimed advantage of the ink set is printed images having good print quality. The pH of the alkali-soluble resin contained in the ink is lowered when it comes in contact with the acidic resin contained in the first liquid which is deposited on the substrate. Lowering of the pH of the alkali-soluble resin results in deposition of that resin and, thus, limited spreading of the dye. When contiguous blocks of yellow, magenta, cyan, and black inks are printed on top of the first liquid, neither color bleeding not uneven mixing were observed at the boundary areas between contiguously printed inks.

In Japan Laid Open Patent Application 04-233693, an ink jet recording process is described with a first ink having a pH in the range from 1 to 6, a second ink having a pH in the range from 4 to 8, a third ink having a pH in the range from 6 to 10, and a fourth ink having a pH in the range from 8 to 13. The first ink contains a water soluble resin having at least one carboxylic acid group, carboxylic acid anhydride, or a sulfonic acid group. The second ink contains a water soluble resin with the same functionalities as that of the first ink or an alkali-soluble resin. The third and fourth inks contain an alkali-soluble resin. Pectinic acid (a synonym for pectin) is used in one example of the invention as the carboxylic acid group containing water soluble resin of the first or second inks. As an example of an alkali-soluble resin for use in the second, third and fourth inks, pectin is given. The claimed advantage of the ink set is printed images having good print quality. With the pH's of the four inks differing as described above, mixing of any two inks results in at least partial deposition of the resins or an increase in at least one of the ink's viscosity. This resin deposition or increased ink viscosity results in limited spreading of the dye(s). When contiguous blocks of yellow, magenta, cyan, and black inks are printed, neither color bleeding not uneven mixing were observed at the boundary areas between contiguously printed inks.

In Japan Laid Open Patent Application 04-348639, an ink jet recording process is described with the yellow, magenta and cyan inks containing a water soluble resin having at least one carboxylic acid group, carboxylic acid anhydride, or a sulfonic acid group and the black ink containing an alkali-soluble resin. The pH's of the yellow, magenta and cyan inks are lower than that of the black ink. The reverse combination is also described. Pectinic acid (a synonym for pectin) is used in one example of the invention as the carboxylic acid group containing water soluble resin (yellow ink). As an example of an alkali-soluble resin, pectin is given. The claimed advantage of the ink set is printed images having good print quality. With the pH of the black ink differing from the pH's of the yellow, magenta and cyan inks as described above, mixing of the black ink with the yellow, magenta and cyan inks results in at least partial deposition of the resins or an increase in at least one of the ink's viscosity. This resin deposition or increased ink viscosity results in limited spreading of the dye(s). When black blocks are printed contiguous to blocks of yellow, magenta, cyan, neither color bleeding not uneven mixing were observed at the boundary areas between the contiguously printed inks.

In U.S. Pat. No. 5,476,540, a method for controlling color bleed between adjacent multicolor regions on a print medium is described. A first composition containing a gel-forming species and a colorant is brought into contact on a region of the print medium with a second composition having a gel-initiating agent and a colorant. In an alternative embodiment of this invention, the print medium may be pretreated with either a gel-initiating or gel-forming species (with no colorant), followed by treatment with a gel-forming species or gel-initiating species (with colorant), respectively. Gel-forming species are selected from a group which includes pectin. Gel-initiating species are selected from a group which includes mineral acids, organic acids, trimethylammonium chloride and ions selected from the group consisting of calcium, magnesium, aluminum, and iron. The formation of the gel upon the print medium impedes the movement of the colorant(s) and, thus, results in improved print quality.

In United States Patent No. 5,112,339, inks for printing on plain paper which comprise a vehicle containing 5 to 20 wt. % of a glycol or glycol ether, 1 to 6 wt. % of a dye, and 0.1 to 1 wt. % of an alginate are described.

In U.S. Pat. No. 5,133,803, ink jet inks which contain high molecular weight colloids, such as alginates, and amphoteric surfactants, and/or non-ionic surfactants are described. The high molecular weight colloids are selected from a group consisting of alginic acid, mannomuronic acid, carrageenan, guar gum, xanthan gum, dextran, chitin, chitosan, and carboxymethylcellulose. The presence of the high molecular weight colloid is claimed to improve the print quality.

All of the above examples represent significant advances in ink jet ink technology, especially with regard to improved print quality. However, there remains a need for ink compositions which can provide further improvements in print quality.

SUMMARY OF THE INVENTION

The inventor of the present invention has found that an ink composition containing pectic acid can be used to generate images having improved print quality. To the best of the inventor's knowledge, there are no reports of ink compositions which contain pectic acid.

Accordingly, it is an object of the present invention to provide an ink composition which meets the requirements for that of an ink used in ink jet recording. In particular, it is an object of the present invention to provide an ink composition from which one can realize vivid images based on dots having sharp edges with minimal feathering.

According to the present invention, there is provided an ink composition comprising a colorant, water, a water-soluble organic solvent and pectic acid.

DETAILED DESCRIPTION OF THE INVENTION

INK COMPOSITION

The ink composition of the present invention is suitable for use in an ink jet printer using any of the methods known in the art for ejecting ink through a plurality of nozzles contained on a print head. The ink composition of the present invention can also be used in a writing instrument such as a pen, in which the conditions for use of the ink are less stringent than those for an ink jet printer.

The essential elements of the ink composition of the present invention are a colorant, water, a water-soluble organic solvent and pectic acid. The ink composition of the present invention can be used to generate images having excellent print quality. In particular, the ink composition can be used to generate vivid images based on dots having sharp edges with minimal feathering. Without intending to be bound by theory, it is believed that when the ink composition of the present invention is deposited on paper, especially a plain paper, the pectic acid in the ink composition gels in the presence of multivalent cations, such as calcium and aluminum, which are contained in plain papers. This gellation prevents the colorant in the ink composition from spreading out on the surface of the paper. Pectin also gels in the presence of multivalent cations. However, the inventor of the present invention, has confirmed that pectic acid is significantly more sensitive than pectin towards gelling initiated by multivalent cations. Furthermore, the ink composition of the present invention can gel in the presence of the small amounts of multivalent cations contained in plain papers. As mentioned in the above Background Art section, the concept in which a gel-initiating species and a gel-forming species is used to prevent the components in an ink composition, especially the colorant, from spreading out on the paper surface is already know in the art. However, it is unexpected that this concept could be used for the case in which the gel-initiating species is the small amount of multivalent cations which are contained in plain papers.

PECTIC ACID

The pectic acid of the present invention is a polymer which is composed primarily of α-1,4 linked polygalacturonic acid. Pectin, on the other hand, is a polymer which is composed primarily of α-1,4 linked polygalacturonic acid methyl ester. The pectic acid of the present invention is the product one obtains by selectively and completely de-esterifying pectin. According to the preferred embodiment of the present invention, the degree of completeness of the de-esterification is preferably 100%. However, the presence of some residual methyl ester groups in the polygalacturonic acid is not excluded in so far as the advantageous results of the present invention are realized. According to the preferred embodiment of the present invention, the degree of esterification is preferably not more than 5%, more preferably less than 3%, and most preferably less than 2%, where the degree of esterification is defined as the percentage of the total number of galacturonic acid units in the pectic acid which are esterified.

In the art pertaining to food products, pectin producers call a pectin with a degree of esterification greater than or equal to 50%, high methoxyl pectin (HM pectin). Similarly, they call a pectin with a degree of esterification less than 50%, low methoxyl pectin (LM pectin). In the art pertaining to food products, pectic acid, having a very low degree of esterification, as described above, is either generally not known or generally not used.

In pectin, the polygalacturonate sequences are occasionally interrupted by 1,2 linked rhamnose residues. Pectin also contains branch chains which are composed mostly of neutral sugar residues such as arabinose, galactose, xylose, and fucose. It follows that pectic acid, obtained by de-esterifying pectin, may have components other than galecturonic acid. Such a pectic acid is usable in the present invention. According to the preferred embodiment of the present invention, the galacturonic acid content of the pectic acid used in the present invention is greater than 75 wt. %, more preferably greater than 85 wt. %, and most preferably greater than 90 wt. %.

According to the present invention, the molecular weight of the pectic acid of the present invention is greater than or equal to 3,500 and less than or equal to 30,000. Pectic acid, having a molecular weight which falls within this range, will readily form gels in the presence of multivalent cations and can be used to formulate inks with viscosities suitable for ink jet printing (for example, less than 10 cps at 20° C.).

The pectic acid of the present invention may be obtained by de-esterifying pectin, a naturally occurring hydrocolloid obtained from fruits such as lemons, limes, grapefruits, oranges, mangoes, apples, sunflowers, and sugar beets. Pectin is obtained from protopectin by extracting the rinds of citrus fruits using an acidic aqueous solution. Typical extraction conditions are as follows: pH: 1 to 3; temperature: 50° to 90° C.; time: 0.5 to 70 hours. During extraction under these acidic conditions, some of the methyl ester units are de-esterified; however, with careful control of the extraction process, pectin with a ratio of galacturonic acid methyl ester residues to galacturonic acid residues as high as 20:1 can be obtained. Typically, the pectin obtained from the acidic extraction process has a degree of esterification greater than 50% (HM pectin). Further processing of HM pectin with either alkaline or acidic aqueous solution results in additional de-esterification. Complete de-esterification of pectin by treatment with strongly alkaline aqueous solution or by enzyme catalysis (pectin methylesterase or pectin pectylhydrolase) yields the pectic acid of the present invention.

It is also possible to use commercially available pectic acid such as Polygalacturonic acid, Catalog No. P 3889, available from Sigma Chemical Inc.

COLORANT

Pigments and dyes may be used as colorants in the present invention in so far as the advantageous results of the present invention can be realized. According to the preferred embodiment of the present invention, the ink composition of the present invention contains an anionic colorant. The anionic colorant may be selected from the group consisting of soluble anionic colorants or dispersed anionic colorants. The soluble anionic colorants of the present invention are more commonly known as water soluble dyes. The dispersed anionic colorants can be classified as dispersant stabilized pigments and surface functionalized pigments.

The soluble anionic colorants of the present invention may comprise any water soluble dye selected from the Acid, Direct, and Food dyes. Such dyes contain carboxylic acid and/or sulfonic acid functionalities. In neutral or alkaline solutions of these dyes, one or more of the acid functionalities is ionized, with the result that the dye is anionic. No particular limitation is imposed on the amount of dye to be used. However, the dye may be preferably in the range from 0.1 to 20 wt. % based on the total weight of the ink.

Water soluble dyes of the present invention may include the following from the Color Index: C.I. Acid Black 7, C.I. Acid Black 24, C.I. Acid Black 26, C.I. Acid Black 48, C.I. Acid Black 52, C.I. Acid Black 58, C.I. Acid Black 60, C.I. Acid Black 107, C.I. Acid Black 109, C.I. Acid Black 118, C.I. Acid Black 119, C.I. Acid Black 131, C.I. Acid Black 140, C.I. Acid Black 155, C.I. Acid Black 156, C.I. Acid Black 187, C.I. Direct Black 17, C.I. Direct Black 19, C.I. Direct Black 32, C.I. Direct Black 38, C.I. Direct Black 51, C.I. Direct Black 71, C.I. Direct Black 74, C.I. Direct Black 75, C.I. Direct Black 112, C.I. Direct Black 117, C.I. Direct Black 154, C.I. Direct Black 163, C.I. Direct Black 168, C.I. Food Black 1, C.I. Food Black 2, C.I. Acid Red 1, C.I. Acid Red 8, C.I. Acid Red 17, C.I. Acid Red 32, C.I. Acid Red 35, C.I. Acid Red 37, C.I. Acid Red 42, C.I. Acid Red 57, C.I. Acid Red 92, C.I. Acid Red 115, C.I. Acid Red 119, C.I. Acid Red 131, C.I. Acid Red 133, C.I. Acid Red 134, C.I. Acid Red 154, C.I. Acid Red 186, C.I. Acid Red 249, C.I. Acid Red 254, C.I. Acid Red 256, C.I. Direct Red 37, C.I. Direct Red 63, C.I. Direct Red 75, C.I. Direct Red 79, C.I. Direct Red 80, C.I. Direct Red 83, C.I. Direct Red 99, C.I. Direct Red 220, C.I. Direct Red 224, C.I. Direct Red 227, C.I. Acid Violet 11, C.I. Acid Violet 34, C.I. Acid Violet 75, C.I. Direct Violet 47, C.I. Direct Violet 48, C.I. Direct Violet 51, C.I. Direct Violet 90, C.I. Direct Violet 94, C.I. Acid Blue 9, C.I. Acid Blue 29, C.I. Acid Blue 62, C.I. Acid Blue 102, C.I. Acid Blue 104, C.I. Acid Blue 113, C.I. Acid Blue 117, C.I. Acid Blue 120, C.I. Acid Blue 175, C.I. Acid Blue 183, C.I. Direct Blue 1, C.I. Direct Blue 6, C. I. Direct Blue 8, C.I. Direct Blue 15, C.I. Direct Blue 25, C.I. Direct Blue 71, C.I. Direct Blue 76, C.I. Direct Blue 80, C.I. Direct Blue 86, C.I. Direct Blue 90, C.I. Direct Blue 106, C.I. Direct Blue 108, C.I. Direct Blue 123, C.I. Direct Blue 163, C.I. Direct Blue 165, C.I. Direct Blue 199, C.I. Direct Blue 226, C.I. Acid Yellow 3, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 49, C.I. Acid Yellow 59, C.I. Acid Yellow 61, C.I. Acid Yellow 72, C.I. Direct Yellow 27, C.I. Direct Yellow 28, C.I. Direct Yellow 33, C.I. Direct Yellow 39, C.I. Direct Yellow 58, C.I. Direct Yellow 86, C.I. Direct Yellow 100 and C.I. Direct Yellow 142.

The dispersed anionic colorants of the present invention which can be classified as dispersant stabilized pigments comprise a wide variety of pigments and anionic dispersants. The term "pigment" refers to an insoluble colorant which may be composed of organic or inorganic materials. For the purpose of achieving good fluid flow through the nozzles of the print head and good dispersion stability, it is desirable to use pigments with small particle sizes. The range of useful particle size is approximately 0.005 to 15 microns. Preferably, the pigment particle size should range from 0.005 to 5 microns, more preferably from 0.005 to 1 microns, and most preferably from 0.01 to 0.3 microns.

Anionic dispersants include the following alkali-soluble resins: styrene-acrylic acid resins, styrene-acrylic acid-acrylic ester resins, styrene-maleic acid resins, styrene-maleic acid half ester resins, iosbutylene-maleic anhydride resins, and rosin-modified maleic acid resins. Anionic surfactant compounds may also be used as anionic dispersants. In neutral or alkaline mixtures containing dispersants of the type listed above, one or more acid functionalities is ionized, with the result that the dispersant is anionic.

Preparation of dispersant stabilized pigments is well known in the art. Examples of dispersant stabilized pigments include those described in Japan Laid-Open Patent Applications 56-147,859, 56-147,860, 58-80,368, 61-200,182, 61-247,774, 61-272,278, 62-568, 62-101,671, 62-101,672, 1-249,869, 1-301,760. No particular limitation is imposed on the amount of dispersant stabilized pigments to be used. However, the dispersant stabilized pigments may be preferably in the range from 1.0 to 20 wt. % based on the total weight of the ink.

The dispersed anionic colorants of the present invention, which can be classified as surface functionalized pigments, comprise a limited number of pigments. Surface functionalities include, but are not limited to, carboxylic acids and sulfonic acids. In neutral or alkaline mixtures containing surface functionalized pigments of this type, one or more of the acid functionalities is ionized, with the result that the pigment is anionic. One example is a hydrophilic black pigment available from the Cabot Corporation, Special Blacks Division; Billerica, Massachusetts, 01821-7001; USA. The average particle size of this surface functionalized pigment is less than 100 nanometers. Other examples include Microjet C-Type CW1 and CW2 available from the Orient Chemical Co., Chuo-ku, Osaka, Japan. The average particle size of these surface functionalized pigments is 50 nanometers. No particular limitation is imposed on the amount of surface functionalized pigments to be used. However, the pigments may be preferably in the range from 1.0 to 20 wt. % based on the total weight of the ink.

BASE

Pectic acid, in its acid form, is practically insoluble in water. Therefore, an additive which can dissolve it in water is needed in order to formulate inks which contain soluble pectic acid. The most generally useful additives are those which can be classified as bases. It should be noted that pectic acid, which has been solubilized with a base, is stable in alkaline solutions. In contrast, pectin, although stable in the pH region from 3 to 4, undergoes chain scission in solutions having pH values higher than 4. Chain scission occurs as a result of β-elimination at the β-position with respect to the carboxylic acid methyl ester group. Pectic acid, which contains little or no carboxylic acid methyl ester groups, is stable with respect to β-elimination in solutions which have high pH values.

The base is not limited in so far as it is capable of dissolving the pectic acid in water and does not adversely affect the quality of the printed image. Presumably the base neutralizes most or all of the carboxylic acid groups of the pectic acid with the salt form of pectic acid being water soluble.

The amount of base used to dissolve the pectic acid depends on the amount of pectic acid. Typically the amount ranges from about 0.6 to 1.0 molar equivalent weight. For purposes of formulating an ink which gives reliable printing performance, in some cases it may be desirable to add base in excess of 1.0 molar equivalent weight.

In general, the base of the present invention can be classified as two types: inorganic bases and organic bases. Typical inorganic bases include LiOH, NaOH, KOH, RbOH, CsOH, sodium metasilicate, disodium hydrogen phosphate, trisodium phosphate, sodium bicarbonate, sodium carbonate, and ammonia. Organic bases used in this invention include organic amines and quaternary organic ammonium hydroxides. Examples of organic amines include methylamine, dimethylamine, trimethylamine, ethylamine, diethylamine, triethylamine, n-propylamine, di-n-propylamine, tri-n-propylamine, isopropylamine, di-isopropylamine, N-methyl-ethylamine, N-methyl-n-propylamine, N-methyl-isopropylamine, N,N-dimethyl-ethylamine, N,N-dimethyl-n-propylamine, N,N-dimethyl-isopropylamine, N,N-diethyl-n-propylamine, N-N-diethyl-isopropylamine, N,N-di-n-propyl-isopropylamine, N-methyl-n-propylamine, N-ethyl-isopropylamine, N-methyl-diethylamine, N-methyl-di-n-propylamine, N-methyl-di-isopropylamine, N-ethyl-di-n-propylamine, N-ethyl-di-isopropylamine, N-methyl-N-ethyl-n-propylamine, N-methyl-N-n-propyl-isopropylamine, N-ethyl-N-n-propyl-isopropylamine, n-butyl-amine, di-n-butylamine, tri-n-butylamine, N-methyl-n-butylamine, N-ethyl-n-butylamine, N-n-propyl-n-butylamine, N-isopropyl-n-butylamine, N-methyl-di-n-butylamine, N-ethyl-di-n-butylamine, N-n-propyl-di-n-butylamine, N-isopropyl-di-n-butylamine, N,N-dimethyl-n-butylamine, N,N-diethyl-n-butylamine, N,N-di-n-propyl-n-butylamine, N,N-di-isopropyl-n-butylamine, N-methyl-N-ethyl-n-butylamine, N-methyl-N-n-propyl-n-butylamine, N-methyl-N-isopropyl-n-butylamine, N-ethyl-N-n-propyl-n-butylamine, N-ethyl-N-isopropyl-n-butylamine, N-n-propyl-N-isopropyl-n-butylamine, sec-butyl-amine, di-sec-butylamine, N-methyl-sec-butylamine, N-ethyl-sec-butylamine, N-n-propyl-sec-butylamine, N-isopropyl-sec-butylamine, N-n-butyl-sec-butylamine, N-methyl-di-sec-butylamine, N-ethyl-di-sec-butylamine, N-n-propyl-di-sec-butylamine, N-n-butyl-di-sec-butylamine, N,N-dimethyl-sec-butylamine, N,N-diethyl-sec-butylamine, N,N-di-n-propyl-sec-butylamine, N,N-di-n-butyl-sec-butylamine, N-methyl-N-ethyl-sec-butylamine, N-methyl-N-n-propyl-sec-butylamine, N-methyl-N-isopropyl-sec-butylamine, N-methyl-N-n-butyl-sec-butylamine, N-ethyl-N-n-propylsec-butylamine, N-ethyl-N-isopropyl-sec-butylamine, N-ethyl-N-n-butyl-sec-butylamine, N-n-propyl-N-isopropyl-sec-butylamine, N-n-propyl-N-n-butyl-sec-butylamine, N-isopropyl-n-butyl-sec-butylamine, tert-butylamine, di-tert-butylamine, N-methyl-tert-butylamine, N-ethyl-tert-butylamine, N-n-propyl-tert-butylamine, N-isopropyl-tert-butylamine, N-n-butyl-tert-butylamine, N-sec-butyl-tert-butylamine, N,N-dimethyl-tert-butylamine, N,N-diethyl-tert-butylamine, N,N-di-n-propyl-tert-butylamine, N,N-di-n-butyl-tert-butylamine, N-methyl-N-ethyl-tert-butylamine, N-methyl-N-n-propyl-tert-butylamine, N-methyl-N-n-butyl-tert-butylamine, N-ethyl-N-n-propyl-tert-butylamine, N-ethyl-N-n-butyl-tert-butylamine, N-n-propyl-N-n-butyl-tert-butylamine, amylamine, diamylamine, N-methyl-amylamine, N-ethyl-amylamine, N-n-propyl-amylamine, N-isopropyl-amylamine, N-n-butyl-amylamine, N-sec-butyl-amylamine, N-isobutyl-amylamine, N-tert-butyl-amylamine, N-methyl-di-amylamine, N-ethyl-di-amylamine, N,N-dimethyl-amylamine, N,N-diethyl-amylamine, N-methyl-N-ethyl-amylamine, isoamylamine, di-isoamylamine, N-methyl-isoamylamine, N-ethyl-isoamylamine, N-n-propyl-isoamylamine, N-isopropyl-isoamylamine, N-n-butyl-isoamylamine, N-sec-butyl-isoamylamine, N-isobutyl-isoamylamine, N-tert-butyl-isoamylamine, N-amyl-isoamylamine, N-methyl-di-isoamylamine, N-ethyl-di-isoamylamine, N,N-dimethyl-isoamylamine, N,N-diethyl-isoamylamine, N-methyl-N-ethyl-isoamylamine, 1-methylbutylamine, di-(1-methylbutyl)amine, N-methyl-1-methylbutylamine, N-ethyl-1-methylbutylamine, N-n-propyl-1-methylbutylamine, N-isopropyl-1-methylbutylamine, N-n-butyl-1-methylbutylamine, N-sec-butyl-l-methylbutylamine, N-isobutyl-1-methylbutylamine, N-tert-butyl-1-methylbutylamine, N-amyl-1-methylbutylamine, N-isoamyl-1-methylbutylamine, N-methyl-di-(1-methylbutyl)-amine, N-ethyl-di-(1-methylbutyl)-amine, N,N-dimethyl-1-methylbutylamine, N,N-diethyl-1-methylbutylamine, N-methyl-N-ethyl-1-methylbutylamine, 2-methylbutylamine, di-(2-methylbutyl)amine, N-methyl-2-methylbutylamine, N-ethyl-2-methylbutylamine, N-n-propyl-2-methylbutylamine, N-isopropyl-2-methylbutylamine, N-n-butyl-2-methylbutylamine, N-sec-butyl-2-methylbutylamine, N-isobutyl-2-methylbutylamine, N-tert-butyl-2-methylbutylamine, N-amyl-2-methylbutylamine, N-isoamyl-2-methylbutylamine, N-(1-methylbutyl)-2-methylbutylamine, N-methyl-di-(2-methylbutyl)-amine, N-ethyl-di-(2-methylbutyl)-amine, N,N-dimethyl-2-methylbutylamine, N,N-diethyl- 2-methylbutylamine, N-methyl-N-ethyl-2-methylbutylamine, 1-ethylpropylamine, di-(1-ethylpropyl)amine, N-methyl-1-ethylpropylamine, N-ethyl-1-ethylpropylamine, N-n-propyl-1-ethylpropylamine, N-isopropyl-1-ethylpropylamine, N-n-butyl-1-ethylpropylamine, N-sec-butyl-1-ethylpropylamine, N-isobutyl-1-ethylpropylamine, N-tert-butyl-1-ethylpropylamine, N-amyl-1-ethylpropylamine, N-isoamyl-1-ethylpropylamine, N-(1-methylbutyl)-1-ethylpropylamine, N-(2-methylbutyl)-1-ethylpropylamine, N,N-dimethyl-1-ethylpropylamine, N,N-diethyl-1-ethylpropylamine, N-methyl-N-ethyl-1-ethylpropylamine, tert-amylamine, di-(tert-amyl)-amine, N-methyl-tert-amylamine, N-ethyl-tert-amylamine, N-n-propyl-tert-amylamine, N-isopropyl-tert-amylamine, N-n-butyl-tert-amylamine, N-sec-butyl-tert-amylamine, N-isobutyl-tert-amylamine, N-tert-butyl-tert-amylamine, N-amyl-tert-amylamine, N-isoamyl-tert-amylamine, N-(1-methylbutyl)-tert-amylamine, N-(2-methylbutyl)-tert-amylamine, N-(1-ethylpropyl)-tert-amylamine, N,N-dimethyl-tert-amylamine, N,N-diethyl-tert-amylamine, N-methyl-N-ethyl-tert-amylamine, cyclopentylamine, di-cyclopentylamine, N-methyl-cyclopentylamine, N-ethyl-cyclopentylamine, N-n-propyl-cyclopentylamine, N-isopropyl-cyclopentylamine, N-n-butyl-cyclopentylamine, N-sec-butyl-cyclopentylamine, N-isobutyl-cyclopentylamine, N-tert-butyl-cyclopentylamine, N-amyl-cyclopentylamine, N-isoamyl-cyclopentylamine, N-(1-methylbutyl)-cyclopentylamine, N-(2-methylbutyl)-cyclopentylamine, N-(1-ethylpropyl)-cyclopentylamine, N-(tert-amyl)-cyclopentylamine, N,N-dimethyl-cyclopentylamine, N,N-diethyl-cyclopentylamine, N-methyl-N-ethyl-cyclopentylamine, hexylamine, di-hexylamine, N-methyl-hexylamine, N-ethyl-hexylamine, N-n-propyl-hexylamine, N-isopropyl-hexylamine, N-n-butyl-hexylamine, N-sec-butyl-hexylamine, N-isobutyl-hexylamine, N-tert-butyl-hexylamine, N-amyl-hexylamine, N-isoamyl-hexylamine, N-(1-methylbutyl)-hexylamine, N-(2-methylbutyl)-hexylamine, N-(1-ethylpropyl)-hexylamine, N-(tert-amyl)-hexylamine, N,N-dimethyl-hexylamine, N,N-diethyl-hexylamine, N-methyl-N-ethyl-hexylamine, cyclohexylamine, di-cyclohexylamine, N-methyl-cyclohexylamine, N-ethyl-cyclohexylamine, N-n-propyl-cyclohexylamine, N-isopropyl-cyclohexylamine, N-n-butyl-cyclohexylamine, N-sec-butyl-cyclohexylamine, N-isobutyl-cyclohexylamine, N-tert-butyl-cyclohexylamine, N-amyl-cyclohexylamine, N-isoamyl-cyclohexylamine, N-(1-methylbutyl)-cyclohexylamine, N-(2-methylbutyl)-cyclohexylamine, N-(1-ethylpropyl)-cyclohexylamine, N-(tert-amyl)-cyclohexylamine, N,N-dimethyl-cyclohexylamine, N,N-diethyl-cyclohexylamine, N-methyl-N-ethyl-cyclohexylamine, heptylamine, N-methyl-heptylamine, N-ethyl-heptylamine, N-n-propyl-heptylamine, N-isopropyl-heptylamine, N-n-butyl-heptylamine, N-sec-butyl-heptylamine, N-isobutyl-heptylamine, N-tert-butyl-heptylamine, N-amyl-heptylamine, N-isoamyl-heptylamine, N-(1-methylbutyl)-heptylamine, N-(2-methylbutyl)-heptylamine, N-(1-ethylpropyl)-heptylamine, N-(tert-amyl)-heptylamine, N,N-dimethyl-heptylamine, N,N-diethyl-heptylamine, N-methyl-N-ethyl-heptylamine, cycloheptylamine, N-methyl-cycloheptylamine, N-ethyl-cycloheptylamine, N-n-propyl-cycloheptylamine, N-isopropyl-cycloheptylamine, N-n-butyl-cycloheptylamine, N-sec-butyl-cycloheptylamine, N-isobutyl-cycloheptylamine, N-tert-butyl-cycloheptylamine, N-amyl-cycloheptylamine, N-isoamyl-cycloheptylamine, N-(1-methylbutyl)-cycloheptylamine, N-(2-methylbutyl)-cycloheptylamine, N-(1-ethylpropyl)-cycloheptylamine, N-(tert-amyl)-cycloheptylamine, N,N-dimethyl-cycloheptylamine, N,N-diethyl-cycloheptylamine, N-methyl-N-ethyl-cycloheptylamine, octylamine, N-methyl-octylamine, N-ethyl-octylamine, N-n-propyl-octylamine, N-isopropyl-octylamine, N-n-butyl-octylamine, N-sec-butyl-octylamine, N-isobutyl-octylamine, N-tert-butyl-octylamine, N,N-dimethyl-octylamine, N-methyl-N-ethyl-octylamine, cyclooctylamine, N-methyl-cyclooctylamine, N-ethyl-cyclooctylamine, N-n-propyl-cyclooctylamine, N-isopropyl-cyclooctylamine, N-n-butyl-cyclooctylamine, N-sec-butyl-cyclooctylamine, N-isobutyl-cyclooctylamine, N-tert-butyl-cyclooctylamine, N,N-dimethyl-cyclooctylamine, nonylamine, N-methyl-nonylamine, N-ethyl-nonylamine, N-n-propyl-nonylamine, N-isopropyl-nonylamine, N,N-dimethyl-nonylamine, decylamine, N-methyl-decylamine, N-ethyl-decylamine, N,N-dimethyl-decylamine, monoethanolamine, diethanolamine, triethanolamine, N-methylmonoethanolamine, N-ethyl-monoethanolamine, N-n-propyl-monoethanolamine, N-isopropyl-monoethanolamine, N-n-butyl-monoethanolamine, N-sec-butyl-monoethanolamine, N-isobutyl-monoethanolamine, N-tert-butyl-monoethanolamine, N,N-dimethyl-monoethanolamine, N,N-diethyl-monoethanolamine, N,N-di-n-propyl-monoethanolamine, N,N-di-n-butyl-monoethanolamine, N-methyl-N-ethyl-monoethanolamine, N-methyl-N-n-propyl-monoethanolamine, N-methyl-N-n-butyl-monoethanolamine, N-ethyl-N-n-propyl-monoethanolamine, N-ethyl-N-n-butyl-monoethanolamine, N-n-propyl-N-n-butyl-monoethanolamine, N-methyl-diethanolamine, N-ethyl-diethanolamine, N-n-propyl-diethanolamine, N-isopropyl-diethanolamine, N-n-butyl-diethanolamine, N-sec-butyl-diethanolamine, N-isobutyl-diethanolamine, N-tert-butyl-diethanolamine, 2-amino-1-propanol, N-methyl-2-amino-1-propanol, N-ethyl-2-amino-1-propanol, N-n-propyl-2-amino-1-propanol, N-isopropyl-2-amino-1-propanol, N-n-butyl-2-amino-1-propanol, N-sec-butyl-2-amino-1-propanol, N-isobutyl-2-amino-1-propanol, N-tert-butyl-2-amino-1-propanol, N,N-dimethyl-2-amino-1-propanol, N,N-diethyl-2-amino-1-propanol, N,N-di-n-propyl-2-amino-1-propanol, N,N-di-n-butyl-2-amino-1-propanol, N-methyl-N-ethyl-2-amino-1-propanol, N-methyl-N-n-propyl-2-amino-1-propanol, N-methyl-N-n-butyl-2-amino-1-propanol, N-ethyl-N-n-propyl-2-amino-1-propanol, N-ethyl-N-n-butyl-2-amino-1-propanol, N-n-propyl-N-n-butyl-2-amino-1-propanol, 3-amino-1-propanol, N-methyl-3-amino-1-propanol, N-ethyl-3-amino-1-propanol, N-n-propyl-3-amino-1-propanol, N-isopropyl-3-amino-1-propanol, N-n-butyl-3-amino-1-propanol, N-sec-butyl-3-amino-1-propanol, N-isobutyl-3-amino-1-propanol, N-tert-butyl-3-amino-1-propanol, N,N-dimethyl-3-amino-1-propanol, N,N-diethyl-3-amino-1-propanol, N,N-di-n-propyl-3-amino-1-propanol, N,N-di-n-butyl-3-amino-1-propanol, N-methyl-N-ethyl-3-amino-1-propanol, N-methyl-N-n-propyl-3-amino-1-propanol, N-methyl-N-n-butyl-3-amino-1-propanol, N-ethyl-N-n-propyl-3-amino-1-propanol, N-ethyl-N-n-butyl-3-amino-1-propanol, N-n-propyl-N-n-butyl-3-amino-1-propanol, monoisopropanolamine, diisopropanolamine, triisopropanolamine, N-methyl-diisopropanolamine, N-ethyl-diisopropanolamine, N-n-propyl-diisopropanolamine, N-isopropyl-diisopropanolamine, N-n-butyl-diisopropanolamine, N-sec-butyl-diisopropanolamine, N-isobutyl-diisopropanolamine, N-tert-butyl-diisopropanolamine, aniline, N-methylaniline, N,N-dimethylaniline, N-ethylaniline, N,N-diethylaniline, N-methyl-N-ethylaniline, benzylamine, N-methylbenzylamine, N,N-dimethylbenzylamine, N-ethylbenzylamine, N, N-diethylbenzylamine, N-methyl-N-ethylbenzylamine, morpholine, N-methylmorpholine, N-ethylmorpholine, N-n-propylmorpholine, N-isopropylmorpholine, N-n-butylmorpholine, N-sec-butylmorpholine, N-isobutylmorpholine, N-tert-butylmorpholine, n-amylmorpholine, pyridine, 2-picoline, 3-picoline, 4-picoline, 2,3-lutidine, 2,4-lutidine, 2,5-lutidine, 2,6-lutidine, 3,4-lutidine, 3,5-lutidine, 2,4,6-collidine, 2-ethylpyridine, 3-ethylpyridine, 4-ethylpyridine, piperazine, N-methylpiperazine, N,N'-dimethylpiperazine, N-ethylpiperazine, N,N'diethylpiperazine, N-methyl-N'-ethylpiperazine, piperidine, N-methylpiperidine, N-ethyl-piperidine, N-n-propylpiperidine, N-isopropylpiperidine, ethylenediamine, N-methyl-ethylenediamine, N,N-dimethyl-ethylenediamine, N,N'-dimethyl-ethylenediamine, N,N,N'-trimethyl-ethylenediamine, N,N,N',N'-tetramethyl-ethylene-diamine, N-ethyl-ethylenediamine, N,N-diethyl-ethylenediamine, N,N'-diethyl-ethylenediamine, N,N,N'-triethyl-ethylenediamine, N,N,N',N'-tetraethyl-ethylenediamine, 1,3-propanediamine, N-methyl-1,3-propanediamine, N,N-dimethyl-1,3-propanediamine, N,N'-dimethyl-1,3-propanediamine, N,N,N'-trimethyl-1,3-propanediamine, N,N,N',N'-tetramethyl-1,3-propanediamine, N-ethyl-1,3-propanediamine, N,N-diethyl-1,3-propanediamine, N,N'-diethyl-1,3-propanediamine, N,N,N'-triethyl-1,3-propanediamine, N,N,N',N'-tetraethyl-1,3-propanediamine, 1,2-propanediamine, N,N,N',N'-tetramethyl-1,2-propanediamine, N,N,N',N'-tetraethyl-1,2-propanediamine, diethylenetriamine, penta-N-methyl-diethylenetriamine, triethylenetetramine, hexa-N-methyl-triethylenetetramine, tetraethylenepentamine, hepta-N-methyl-triethylenetetramine, di-n-propanolamine, tri-n-propanolamine.

Examples of quaternary organic ammonium hydroxides include tetramethylammonium hydroxide, tetraethylammonium hydroxide, tetra-n-propylammonium hydroxide, tetra-n-butylammonium hydroxide, methyltriethylammonium hydroxide, methyltri-n-propylammonium hydroxide, methyltri-n-butylammonium hydroxide, ethyltri-n-propylammonium hydroxide, ethyltri-n-butylammonium hydroxide, n-propyltri-n-butylammonium hydroxide, ethyltrimethylammonium hydroxide, n-propyltrimethylammonium hydroxide, n-butyltrimethylammonium hydroxide, n-amyltrimethylammonium hydroxide, n-hexyltrimethylammonium hydroxide, n-heptyltrimethylammonium hydroxide, n-octyltrimethylammonium hydroxide.

From the standpoint of compatibility with the penetrable solvents used in the present invention, organic amines and quaternary organic ammonium hydroxides are preferred as bases, in comparison with inorganic bases.

In useful ink formulations, in which the amount of penetrable solvent is less than or equal to about 20 wt. %, salts of pectic acid derived from pectic acid and either inorganic or organic bases are completely soluble in the aqueous solutions.

However, for penetrable solvents with a vapor pressure lower than water, when the ink is stored in the print head for an extended period of time, water will be lost at a faster rate than the penetrable solvent, and the relative weight fraction of the penetrable solvent will increase. Salts of pectic acid and inorganic bases are less compatible than salts of pectic acid and organic bases in Such aqueous solutions which contain relatively large amount of the penetrable solvent. The present inventor has confirmed that, for 1 wt. % solutions of salts of pectic acid in an aqueous solution containing 50 wt. % of diethylene glycol mono-n-butyl ether, a commonly used penetrable solvent, very slight, gelling occurs for salts of pectic acid derived from pectic acid and inorganic bases, such as LiOH, NaOH, KOH, and ammonia. In contrast, for salts of pectic acid and organic bases, such as trimethylamine, triethanolamine, morpholine, and cyclohexylamine, compete solubility in aqueous 50% diethylene glycol mono-n-butyl ether solution is observed.

As mentioned above, slight gelling of pectic acid occurs when inorganic bases are used in the presence of relatively large amounts of penetrable solvents. If one increases the relative amount of diethylene glycol mono-n-butyl ether from 50% to 70% for the same 1 wt. % pectic acid solution, the degree of gelling can be differentiated. The order in terms of increasing gelling is as follows: LiOH <<ammonia<<<NaOH, KOH. In summarizing this result, it can be stated that among inorganic bases, LiOH is preferred in terms of compatibility with penetrable solvent. In formulating ink compositions using LiOH, lithium hydroxide monohydrate is preferred over anhydrous lithium hydroxide, because anhydrous lithium hydroxide readily absorbs carbon dioxide and water from the air.

When the colorant in the ink composition is an anionic colorant, the use of inorganic bases is preferred over organic bases from the standpoint of solubility or dispersibility of the anionic colorant. In terms of both print quality, specifically optical density, and reliability, high solubility, and high dispersability of the colorant in aqueous media is a desired quality for an ink composition for ink jet recording. For this reason, for some ink formulations inorganic bases may be preferred over organic bases for dissolving the pectic acid.

PENETRABLE SOLVENT

The ink composition of the present invention may contain a penetrable solvent which gives a good drying rate of the printed image.

The penetrable solvent usable in the present invention includes at least one selected from the group consisting of lower alkyl ethers of polyhydric alcohols. Examples of lower alkyl ethers of polyhydric alcohols include ethylene glycol monomethyl ether, ethylene glycol dimethyl ether, ethylene glycol monoethyl ether, ethylene glycol diethyl ether, ethylene glycol mono-n-propyl ether, ethylene glycol mono-isopropyl ether, ethylene glycol mono-n-butyl ether, ethylene glycol mono-sec-butyl ether, ethylene glycol mono-isobutyl ether, ethylene glycol mono-tert-butyl ether, ethylene glycol mono-n-amyl ether, ethylene glycol mono-n-hexyl ether, propylene glycol mono-methyl ether, propylene glycol dimethyl ether, propylene glycol monoethyl ether, propylene glycol diethyl ether, propylene glycol, mono-n-propyl ether, propylene glycol mono-isopropyl ether, propylene glycol mono-n-butyl ether, propylene glycol mono-sec-butyl ether, propylene glycol mono-isobutyl ether, propylene glycol mono-tert-butyl ether, diethylene glycol monomethyl ether, diethylene glycol dimethyl ether, diethylene glycol monoethyl other, diethylene glycol mono-n-propyl ether, diethylene glycol mono-isopropyl ether, diethylene glycol mono-n-butyl ether, dipropylene glycol monomethyl ether, dipropylene glycol monoethyl ether, dipropylene glycol mono-n-propyl ether and dipropylene glycol mono-n-butyl ether.

No particular limitation is imposed on the amount of penetrable solvent to be used in the ink. Preferably it is present in a range of 1 to 20 wt. %.

PENETRABILITY-IMPARTING SURFACTANT

The ink composition of the present invention may contain a penetrability-imparting surfactant instead of or in addition to the above penetrable solvent.

The penetrability-imparting surfactant usable in the present invention includes at least one selected from the group consisting of anionic or non-ionic surfactants. Examples of anionic surfactants include fatty acid salts, higher alcohol sulfuric ester salts, alkylbenzene sulfonates, and higher alcohol phosphoric ester salts. Examples of nonionic surfactants include ethylene oxide adducts of acetylenic diols, ethylene oxide adducts of higher alcohols, ethylene oxide adducts of alkylphenols, aliphatic ethylene oxide adducts, ethylene oxide adducts of higher alcohol fatty acid esters, ethylene oxide adducts of higher alkyl amines, ethylene oxide adducts of fatty acid amides, ethylene oxide adducts of polypropylene glycol, fatty acid esters of polyhydric alcohols, alkanolamine fatty acid amides and ethylene oxide-propylene oxide copolymers.

Preferably used are ethylene oxide adducts of acetylenic diols which are available from Air Products and Chemicals, Inc.; Allentown, Pa., 18195; USA. Examples include Surfynol 465 (ethoxylated tetramethyl decynediol), Surfynol CT-136 (acetylenic diol and anionic surfactant blend), Surfynol GA (acetylenic diol blend) and Surfynol TG (acetylenic diol blend in ethylene glycol).

No particular limitation is imposed on the amount of penetrability-imparting surfactant to be used in the ink. Preferably it is present in a range of 0.01 to 5 wt. %.

OTHER COMPONENTS

In addition to the above described components, the ink composition of the present invention may contain, optionally, one or more water soluble organic solvents. Water soluble organic solvents are well known and include: alcohols such as isopropyl alcohol and butyl alcohols; ketones such as acetone and methyl ethyl ketone; ethers such as tetrahydrofuran and dioxane; esters such as ethyl acetate and propylene carbonate; polyhydric alcohols such as ethylene glycol, propylene glycol, butylene glycol, diethylene glycol, triethylene glycol, polyethylene glycol, polypropylene glycol, 1,5-pentanediol, 1,2,6-hexanetriol and thiodiglycol; nitrogen containing compounds such as urea, pyrrolidone and N-methyl-2-pyrrolidone; sulfur containing compounds such as dimethylsulfoxide and tetramethylene sulfoxide.

In addition to the above solvents, the inks may contain additives such as pH buffers, biocides, viscosity modifiers, ultraviolet ray absorbers, and antioxidants.

The amounts of all components of the ink are selected such that the viscosity of the ink is less than 10 cps at 20° C.

EXAMPLES

The present invention will be further clarified by the following specific examples.

Preparation of Pectic Acid

Pectic acid used in the below examples was prepared using the following general procedure. A HM pectin (for example: BA-KING, The Copenhagen Pectin Factory Ltd.) is slurried at 10% by weight in a solution of isopropanol and water (60:40). Sodium hydroxide in the amount of half of the weight of the HM pectin is added to the slurry. The combined slurry is then stirred for 3 days at 40° C. The solid is collected by filtration and washed extensively using a solution of isopropanol and water (60:40). Next, the solid is suspended in an excess of water. The pH of the suspension is adjusted to about 1.5 by slow addition of 1M aqueous oxalic acid. After stirring the acidified suspension for 24 hours, the solid pectic acid is collected by filtration. The solid is washed extensively first with a solution of ethanol and water (60:40), then washed with ethanol, and then dried under vacuum.

The molecular weight of the pectic acid used in the below examples was determined by the viscosity-based procedure of Smit and Bryant (Journal of Food Science, Vol. 32, p.197, 1967). The molecular weights ranged from 8000 to 20000.

The galacturonic acid content of the pectic acid used in the below examples was determined by the following procedure. A 500 mg sample of pectic acid, weighed to the nearest 0.1 mg, and ethanol (2 mL) are transferred to a 250 Erlenmeyer flask. Next, 100 mL of freshly boiled deionized water and 5 drops of phenolphthalein indicator solution are added to the flask. While stirring with a magnetic stir bar, the mixture is titrated to the characteristic faint pink endpoint with standardized 0.1N sodium hydroxide solution. The results of the titration are recorded as V in mL. The percent of galacturonic acid is calculated by the following formula: (V in mL)×1941/(sample weight in mg). The galacturonic acid contents ranged from 85 to 90%.

The pectin used in the below Comparative Examples is a commercially available LM pectin (Product Name: LM-104AS, The Copenhagen Pectin Factory Ltd.), having a degree of esterification of approximately 28%.

In comparisons between inks of the present invention (inks containing pectic acid and base) and comparative example inks (inks not containing pectic acid and base), for purposes of a fair comparison, the viscosities of all inks are adjusted to approximately the same value, about 4.1 cps at 20° C. Additionally, all of the inks are formulated such that they have the same or nearly the same surface tensions, about 33 dyne/cm.

Example 1

2.00 g of pectic acid and 0.90 g of di-n-propylamine were dissolved in 97.10 g of ultrapure water with stirring. The hazy solution was ultracentrifuged for 30 minutes (RCF: 80,000×g) which resulted in a clear supernatant separating from a small amount of gelled impurity. 30.0 g of the above supernatant was added to a solution of 2.5 g Kayarus Supra Yellow RL (Product Name, Nippon Kayaku, C.I. Direct Yellow 86), 5.0 g of glycerol, 5.0 g of diethylene glycol, 8.0 g diethylene glycol mono-n-butyl ether, 0.8 g of Surfynol 465, and 48.7 g of ultrapure water. The solution was stirred for 2 hours and then filtered through a 5 µm stainless steel mesh.

Example 2

2.00 g of pectic acid and 0.84 g of cyclohexylamine were dissolved in 97.16 g of ultrapure water with stirring. The hazy solution was ultracentrifuged for 30 minutes (RCF: 80,000×g) which resulted in a clear supernatant separating from a small amount of gelled impurity. 30.0 g of the above supernatant was added to a solution of 2.5 g Kayacryl Rhodamine FB (Product Name, Nippon Kayaku, C.I. Acid Red 52), 5.0 g of glycerol, 5.0 g of diethylene glycol, 8.0 g diethylene glycol mono-n-butyl ether, 0.8 g of Surfynol 465, and 48.7 g of ultrapure water. The solution was stirred for 2 hours and then filtered through a 5 µm stainless steel mesh.

Example 3

2.00 g of pectic acid and 0.78 g of morpholine were dissolved in 97.22 g of ultrapure water with stirring. The hazy solution was ultracentrifuged for 30 minutes (RCF: 80,000×g) which resulted in a clear supernatant separating from a small amount of gelled impurity. 30 g of the above supernatant was added to a solution of 3.5 g Kayarus Turquoise Blue (Product Name, Nippon Kayaku, C.I. Direct Blue 86), 5.0 g of glycerol, 5.0 g of diethylene glycol, 8.0 g diethylene glycol mono-n-butyl ether, 0.8 g of Surfynol 465, and 47.7 g of ultrapure water. The solution was stirred for 2 hours and then filtered through a 5 µm stainless steel mesh.

Example 4

2.00 g of pectic acid and 1.71 g of 30% aqueous trimethylamine were dissolved in 96.29 g of ultrapure water with stirring. The hazy solution was ultracentrifuged for 30 minutes (RCF: 80,000×g) which resulted in a clear supernatant separating from a small amount of gelled impurity. 30 g of the above supernatant was added to a solution of 2.0 g Food Black 2 (C.I. Food Black 2), 5.0 g of glycerol, 5.0 g of diethylene glycol, 8.0 g diethylene glycol mono-n-butyl ether, 0.8 g of Surfynol 465, and 49.2 g of ultrapure water. The solution was stirred for 2 hours and then filtered through a 5 µm stainless steel mesh.

Example 5

2.0 g of the potassium salt of pectic acid (Product Name: Polygalacturonic acid, Potassium salt from Orange, Sigma Chemical Co., Catalog Number: P7276) was dissolved in 98.0 g of ultrapure water with stirring. The hazy solution was ultracentrifuged for 30 minutes (RCF: 80,000×g) which resulted in a clear supernatant separating from a small amount of gelled impurity. 35 g of the above supernatant was added to a solution of 2.0 g Food Black 2 (C.I. Food Black 2), 5.0 g of glycerol, 5.0 g of diethylene glycol, 8.0 g diethylene glycol mono-n-butyl ether, 0.8 g of Surfynol 465, and 44.2 g of ultrapure water. The solution was stirred for 2 hours and then filtered through a 5 µm stainless steel mesh.

Example 6

2.00 g of pectic acid and 1.30 g of triethanolamine were dissolved in 96.70 g of ultrapure water with stirring. The hazy solution was ultracentrifuged for 30 minutes (RCF: 80,000×g) which resulted in a clear supernatant separating from a small amount of gelled impurity. 25 g of the above supernatant was added to a mixture containing 35 g of a 20 wt. % surface functionalized carbon black dispersion (Product Name: Microjet C-Type CW1, Orient Chemical Co.), 5.0 g of glycerol, 5.0 g of 1,5-pentanediol, 5.0 g diethylene glycol mono-n-butyl ether, 0.7 g of Surfynol TG, and 24.3 g of ultrapure water. The mixture was stirred for 2 hours and then filtered through a 5 µm stainless steel mesh.

Example 7

2.00 g of pectic acid and 0.37 g of lithium hydroxide monohydrate were dissolved in 97.63 g of ultrapure water with stirring. The slightly hazy solution was ultracentrifuged for 30 minutes (RCF: 80,000×g) which resulted in a clear supernatant separating from a small amount of gelled impurity. 25.0 g of Congo Red (Product Name: Congo Red, certified; Aldrich Chemical. Co.; Catalog Number: 86,095-6; C.I. Direct Red 28) was dissolved in a minimum amount of deionized water with stirring. Hydrochloric acid solution (1M) was added slowly to the stirred Congo Red solution until the pH of the solution reached approximately 0.5. A precipitate formed which was collected by suction filtration of the mixture through a medium porosity fritted glass filter. The solid was washed with isopropanol, washed with diethyl ether, and dried under vacuum for 24 hours. A solution containing 3.00 g of the acid precipitated Congo Red, 0.39 g of lithium hydroxide monohydrate, 5.00 g of glycerol, 5.00 g of diethylene glycol, 8.00 g diethylene glycol mono-n-butyl ether, 0.80 g of Surfynol 465, and 47.81 g of ultrapure water was prepared.. To this solution was added 30.00 g of the above prepared pectic acid and lithium hydroxide monohydrate solution. The combined solution was stirred for 2 hours and then filtered through a 5 µm stainless steel mesh.

Example 8

The same pectic acid and lithium hydroxide monohydrate solution as was used in Example 7 was prepared by the method described in Example 7. 25.0 g of Benzopurpurin 4B (Aldrich Chemical Co.; Catalog Number: 22,882-6; C.I. Direct Red 2) was dissolved in a minimum amount of deionized water with stirring. Hydrochloric acid solution (1M) was added slowly to the stirred Benzopurpurin 4B solution until the pH of the solution reached approximately 0.5. A precipitate formed which was collected by suction filtration of the mixture through a medium porosity fritted glass filter. The solid was washed with isopropanol, washed with diethyl ether, and dried under vacuum for 24 hours. A solution containing 3.00 g of the acid precipitated Benzopurpurin 4B, 0.37 g of lithium hydroxide monohydrate, 5.00 g of glycerol, 5.00 g of diethylene glycol, 8.00 g diethylene glycol mono-n-butyl ether, 0.80 g of Surfynol 465, and 47.83 g of ultrapure water was prepared. To this solution was added 30.00 g of the pectic acid and lithium hydroxide monohydrate solution. The combined solution was stirred for 2 hours and then filtered through a 5 μm stainless steel mesh.

Example 9

The same pectic acid and lithium hydroxide monohydrate solution as was used in Example 7 was prepared by the method described in Example 7. 50.0 g of Thiazol Yellow G (Aldrich Chemical Co.; Catalog Number: 20,204-5; C.I. Direct Yellow 9) was dissolved in a minimum amount of deionized water with stirring. Hydrochloric acid solution (1M) was added slowly to the stirred Thiazol Yellow G solution until the pH of the solution reached approximately 0.5. A precipitate formed which was collected by suction filtration of the mixture through a medium porosity fritted glass filter. The solid was washed with isopropanol, washed with diethyl ether, and dried under vacuum for 24 hours. A solution containing 2.80 g of the acid precipitated Thiazol Yellow G, 0.36 g of lithium hydroxide monohydrate, 5.00 g of glycerol, 5.00 g of diethylene glycol, 8.00 g diethylene glycol mono-n-butyl ether, 0.80 g of Surfynol 465, and 48.04 g of ultrapure water was prepared. To this solution was added 30.00 g of the pectic acid and lithium hydroxide monohydrate solution. The combined solution was stirred for 2 hours and then filtered through a 5 μm stainless steel mesh.

Example 10

The same pectic acid and lithium hydroxide monohydrate solution as was used in Example 7 was prepared by the method described in Example 7. A solution containing 6.00 g of Copper (II) phthalocyaninetetrasulfonic acid (Aldrich Chemical Co.; Catalog Number: 41,205-8), 0.56 g of lithium hydroxide monohydrate, 5.00 g of glycerol, 5.00 g of diethylene glycol, 8.00 g diethylene glycol mono-n-butyl ether, 0.80 g of Surfynol 465, and 44.64 g of ultrapure water was prepared. To this solution was added 30.00 g of the pectic acid and lithium hydroxide monohydrate solution. The combined solution was stirred for 2 hours and then filtered through a 5 μm stainless steel mesh.

Comparative Example 1

A solution containing 2.5 g Kayarus Supra Yellow RL (Product Name, Nippon Kayaku, C.I. Direct Yellow 86), 15.0 g of glycerol, 5.0 g of diethylene glycol, 8.0 g diethylene glycol mono-n-butyl ether, 0.8 g of Surfynol 465, and 68.7 g of ultrapure water was prepared. The solution was stirred for 2 hours and then filtered through a 5 μm stainless steel mesh.

Comparative Example 2

A solution containing 2.50 g Kayarus Supra Yellow RL (Product Name, Nippon Kayaku, C.I. Direct Yellow 86), 0.06 g LM pectin (Product Name: LM-104AS, The Copenhagen Pectin Factory Ltd.), 5.00 g of glycerol, 5.00 g of diethylene glycol, 8.00 g diethylene glycol mono-n-butyl ether, 0.80 g of Surfynol 465, and 78.64 g of ultrapure water was prepared. The solution was stirred for 2 hours and then filtered through a 5 μm stainless steel mesh.

Comparative Example 3

A solution containing 2.5 g Kayacryl Rhodamine FB (Product Name, Nippon Kayaku, C.I. Acid Red 52), 15.0 g of glycerol, 5.0 g of diethylene glycol, 8.0 g diethylene glycol mono-n-butyl ether, 0.8 g of Surfynol 465, and 68.7 g of ultrapure water was prepared. The solution was stirred for 2 hours and then filtered through a 5 μm stainless steel mesh.

Comparative Example 4

A solution containing 2.50 g Kayacryl Rhodamine FB (Product Name, Nippon Kayaku, C.I. Acid Red 52), 0.06 g LM pectin (Product Name: LM-104AS, The Copenhagen Pectin Factory Ltd.), 5.00 g of glycerol, 5.00 g of diethylene glycol, 8.00 g diethylene glycol mono-n-butyl ether, 0.80 g of Surfynol 465, and 78.64 g of ultrapure water was prepared. The solution was stirred for 2 hours and then filtered through a 5 μm stainless steel mesh.

Comparative Example 5

A solution containing 3.5 g Kayarus Turquoise Blue (Product Name, Nippon Kayaku, C.I. Direct Blue 86), 15.0 g of glycerol, 5.0 g of diethylene glycol, 8.0 g diethylene glycol mono-n-butyl ether, 0.8 g of Surfynol 465, and 67.7 g of ultrapure water was prepared. The solution was stirred for 2 hours and then filtered through a 5 μm stainless steel mesh.

Comparative Example 6

A solution containing 3.50 g Kayarus Turquoise Blue (Product Name, Nippon Kayaku, C.I. Direct Blue 86), 0.06 g LM pectin (Product Name: LM-104AS, The Copenhagen Pectin Factory Ltd.), 5.00 g of glycerol, 5.00 g of diethylene glycol, 8.00 g diethylene glycol mono-n-butyl ether, 0.80 g of Surfynol 465, and 77.64 g of ultrapure water was prepared. The solution was stirred for 2 hours and then filtered through a 5 μm stainless steel mesh.

Comparative Example 7

A solution containing 2.0 g Food Black 2 (C.I. Food Black 2), 15.0 g of glycerol, 5.0 g of diethylene glycol, 8.0 g diethylene glycol mono-n-butyl ether, 0.8 g of Surfynol 465, and 69.2 g of ultrapure water was prepared. The solution was stirred for 2 hours and then filtered through a 5 μm stainless steel mesh.

Comparative Example 8

A solution containing 2.00 g Food Black 2 (C.I. Food Black 2), 0.08 g LM pectin (Product Name: LM-104AS, The Copenhagen Pectin Factory Ltd.), 5.00 g of glycerol, 5.00 g of diethylene glycol, 8.00 g diethylene glycol mono-n-butyl ether, 0.80 g of Surfynol 465, and 79.12 g of ultrapure water was prepared. The solution was stirred for 2 hours and then filtered through a 5 μm stainless steel mesh.

Comparative Example 9

A mixture containing 35 g of a 20 wt. % surface functionalized carbon black dispersion (Product Name: Microjet C-Type CW1, Orient Chemical Co.), 15.0 g of glycerol, 5.0 g of 1,5-pentanediol, 5.0 g diethylene glycol mono-n-butyl ether, 0.7 g of Surfynol TG, and 39.3 g of ultrapure water was prepared. The mixture was stirred for 2 hours and then filtered through a 5 μm stainless steel mesh.

Comparative Example 10

Acid precipitated Congo Red was prepared as described in Example 7. A solution containing 3.00 g of the acid precipitated Congo Red, 0.39 g of lithium hydroxide monohydrate, 0.06 g LM pectin (Product Name: LM-104AS, The Copenhagen Pectin Factory Ltd.), 5.00 g of glycerol, 5.00 g of diethylene glycol, 8.00 g diethylene glycol mono-n-butyl ether, 0.80 g of Surfynol 465, and 77.75 g of ultrapure water was prepared. The solution was stirred for 2 hours and the filtered through a 5 μm stainless steel mesh.

Comparative Example 11

Acid precipitated Benzopurpurin 4B was prepared as described in Example 8. A solution containing 3.00 g of the acid precipitated Benzopurpurin 4B, 0.37 g of lithium hydroxide monohydrate, 15.00 g of glycerol, 5.00 g of diethylene glycol, 8.00 g diethylene glycol mono-n-butyl ether, 0.80 g of Surfynol 465, and 67.83 g of ultrapure water was prepared. The solution was stirred for 2 hours and then filtered through a 5 μm stainless steel mesh.

Comparative Example 12

Acid precipitated Thiazol Yellow G was prepared as described in Example 9. A solution containing 2.80 g of the acid precipitated Thiazol Yellow-G, 0.36 g of lithium hydroxide monohydrate, 0.06 g LM pectin (Product Name: LM-104AS, The Copenhagen Pectin Factory Ltd.), 5.00 g of glycerol, 5.00 g of diethylene glycol, 8.00 g diethylene glycol mono-n-butyl ether, 0.80 g of Surfynol 465, and 77.98 g of ultrapure water was prepared. The solution was stirred for 2 hours and then filtered through a 5 μm stainless steel mesh.

Comparative Example 13

A solution containing 6.00 g of Copper (II) phthalocyaninetetrasulfonic acid (Aldrich Chemical Co.; Catalog Number: 41,205-8), 0.56 g of lithium hydroxide monohydrate, 15.00 g of glycerol, 5.00 g of diethylene glycol, 8.00 g diethylene glycol mono-n-butyl ether, 0.80 g of Surfynol 465, and 64.64 g of ultrapure water was prepared. The solution was stirred for 2 hours and then filtered through a 5 μm stainless steel mesh.

For the ink compositions prepared as described above, the colorants and non-solvent additives are summarized in the below table.

TABLE 1

| | | Colorant | Additive |
|---|---|---|---|
| Example | | | |
| | 1 | C.I. Direct Yellow 86 | pectic acid di-n-propylamine |
| | 2 | C.I. Acid Red 52 | pectic acid cyclohexylamine |
| | 3 | C.I. Direct Blue 86 | pectic acid morpholine |
| | 4 | C.I. Food Black 2 | pectic acid |

TABLE 1-continued

| | | Colorant | Additive |
|---|---|---|---|
| | | | trimethylamine |
| | 5 | C.I. Food Black 2 | pectic acid KOH |
| | 6 | Carbon Black Dispersion | pectic acid triethanolamine |
| | 7 | C.I. Direct Red 28 | pectic acid LiOH monohydrate |
| | 8 | C.I. Direct Red 2 | pectic acid LiOH monohydrate |
| | 9 | C.I. Direct Yellow 9 | pectic acid LiOH monohydrate |
| | 10 | Copper (II) phthalocyanine-tetra-sulfonic acid | pectic acid LiOH monohydrate |
| Comparative Example | | | |
| | 1 | C.I. Direct Yellow 86 | none |
| | 2 | C.I. DIrect Yellow 86 | LM-pectin |
| | 3 | C.I. Direct Red 52 | none |
| | 4 | C.I. Direct Red 52 | LM-pectin |
| | 5 | C.I. Direct Blue 86 | none |
| | 6 | C.I. DIrect Blue 86 | LM-pectin |
| | 7 | C.I. Food Black 2 | none |
| | 8 | C.I. Food Black 2 | LM-pectin |
| | 9 | Carbon Black Dispersion | none |
| | 10 | C.I. Direct Red 28 | LM-pectin |
| | 11 | C.I. Direct Red 2 | none |
| | 12 | C.I. Direct Yellow 9 | LM-pectin |
| | 13 | Copper (II) phthalocyanine-tetra-sulfonic acid | none |

Evaluation tests of inks

Continuous printing test

The reliability under continuous printing conditions of the ink compositions was evaluated as follows. First, the ink was degassed and sealed in a heat-sealable aluminum pack. Next, the ink was loaded into the print head of an MJ-700V2C printer (Seiko Epson Corporation). A line pattern which uses all of the nozzles was printed initially to establish that ink was being ejected from all nozzles with good directionality. The printing pattern was changed to one with intermittent solid blocks and an all nozzle line pattern. The combination pattern fills an A4 size sheet of paper. The block and line pattern was printed continuously with a printed sheet being evaluated every 100 sheets for evidence of loss of directionality, clogged nozzles, or decreases in optical density of the solid blocks, less than 5%. For all of the inks tested, no loss of directionality, no clogged nozzles, and no decreases in optical density were observed for 10,000 printed sheets.

Intermittent printing test

The reliability under intermittent printing conditions of the above ink compositions was evaluated as follows. First, the ink was degassed and sealed in a heat-sealable aluminum pack. Next, the ink was loaded into the print head of an MJ-700V2C printer (Seiko Epson Corporation). A line pattern which uses all of the nozzles was printed initially to establish that ink was being ejected from all nozzles with good directionality. The printing pattern was changed to one in which one drop is ejected from each nozzle successively, followed by a resting period during which the print head remains uncovered and no ink drops are ejected. This pattern, consisting of all nozzle one dot ejections followed by a rest period, is repeated successively with the length of the rest period increasing in units of 5 seconds. For example, the first rest period is 5 seconds, the second rest period is 10 seconds, the third rest periods is 15 seconds, etc. The time interval of the rest period in which a nozzle first fails was recorded. For all of the inks tested, the minimum time interval before the first nozzle failure was greater than 90 seconds.

Storage in the print head test

The reliability towards long term storage in the print head of the above ink compositions was evaluated as follows. First, the ink was degassed and sealed in a heat-sealable aluminum pack. Next, the ink was loaded into the print head of an MJ-700V2C printer (Seiko Epson Corporation). A line pattern which uses all of the nozzles was printed initially to establish that ink was being ejected from all nozzles with good directionality. Next, the ink supply was removed from the print head, and then the print head was removed from the printer. The uncapped print head was stored for 7 days at 40° C. in a constant temperature oven. The print head was reattached to the printer and the ink supply was reattached to the print head. The cleaning operation of the printer was executed followed by a line pattern which uses all of the nozzles. The cleaning operation followed by the line pattern was repeated until all of the nozzles printed with good directionality. The number of cleaning operations until all of the nozzles recovered was recorded. For all of the inks tested, the number of cleaning operations necessary for full recovery was less than or equal to 3.

Thermal cycle stability test

The reliability towards two temperature extremes, −30° C. and 60° C. of the above ink compositions was evaluated as follows. First, the ink was degassed and sealed in a 30 ml glass sample bottle. The sample bottle was loaded into a 60° C. constant temperature oven and stored at that temperature condition for 24 hours. The sample was removed from the oven and transferred to a −30° C. constant temperature refrigerator and stored at that temperature condition for 24 hours. This two temperature cycle was repeated such that a total of ten cycles was completed. After the last cycle, the ink was thawed to room temperature and examined for the formation of precipitates and/or color changes. For all of the inks tested, no precipitates or color changes were observed.

Drying speed test

The drying times of the above ink compositions were evaluated by printing a series of solid block patterns and wiping the patterns in 10 seconds increments. The printing was carried out using an MJ-700V2C printer (Seiko Epson Corporation). The time in which the printed ink would not smear was recorded. For all of the inks tested, the drying time was less than 10 seconds, the smallest time interval before the first wipe.

Print quality test #1

Print quality was evaluated using an MJ-700V2C printer (Seiko Epson Corporation). A standard set of Japanese Kanji characters was printed using a Gothic and a Minchou font at a 4 point character size. The samples were printed at 360 dpi. Four types of plain paper were used: Xerox 4024, Xerox R, Yamayuri and Conqueror Laid. The print samples were evaluated using an optical microscope. The following standards were used to evaluate the print quality.

A: the Kanji characters were sharp with no filling of interior voids within the characters, B: the Kanji characters were sharp, but there was some filling of interior voids within the characters with stroke counts greater than about 15, and NG: the Kanji characters were not sharp and there was significant filling of interior voids within the characters with stroke counts greater than about 10.

The results of the test are shown below in Table 2.

Print quality test #2

Print quality was evaluated by measuring the width of one dot lines printed at 360 dpi using an MJ-700V2C printer (Seiko Epson Corporation). The same four types of plain paper were used as described above. The results of the test are shown below in Table 2.

TABLE 2

|  | Print Quality #1 | Average line width ($\mu$m) |
|---|---|---|
| Example |  |  |
| 1 | A | 110 |
| 2 | A | 110 |
| 3 | A | 105 |
| 4 | A | 110 |
| 5 | A | 110 |
| 6 | A | 95 |
| 7 | A | 110 |
| 8 | A | 110 |
| 9 | A | 110 |
| 10 | A | 110 |
| Comparative Example |  |  |
| 1 | NG | 125 |
| 2 | NG | 125 |
| 3 | NG | 130 |
| 4 | NG | 130 |
| 5 | NG | 125 |
| 6 | NG | 125 |
| 7 | NG | 130 |
| 8 | NG | 130 |
| 9 | B | 105 |
| 10 | NG | 125 |
| 11 | NG | 130 |
| 12 | NG | 125 |
| 13 | NG | 130 |

What is claimed is:

1. An ink composition comprising: a colorant; water; a water-soluble organic solvent; and pectic acid.

2. The ink composition of claim 1, wherein the pectic acid comprises primarily α-1,4 linked polygalacturonic acid having a degree of esterification not more than 5%, where the degree of esterification is defined as the percentage of the total number of galacturonic acid units in the pectic acid which are esterified.

3. The ink composition of claim 2, wherein the degree of esterification is less than 3%.

4. The ink composition of claim 1, wherein the molecular weight of pectic acid is greater than or equal to 3,500 and less than or equal to 30,000.

5. The ink composition of claim 1, wherein the colorant is an anionic colorant.

6. The ink composition of claim 5, wherein the anionic colorant is a soluble anionic colorant or a dispersed anionic colorant.

7. The ink composition of claim 1, further comprising a penetrable solvent and/or a penetrability-imparting surfactant.

8. The ink composition of claim 7, wherein the penetrable solvent is a lower alkyl ether of a polyhydric alcohol.

9. The ink composition of claim 8, wherein the penetrability-imparting surfactant is an anionic surfactant or a nonionic surfactant.

10. The ink composition of claim 1, further comprising a base in an amount sufficient to effect dissolution of the pectic acid in the ink.

11. The ink composition of claim 10, wherein the base is an organic amine, a quaternary organic ammonium hydroxide, or lithium hydroxide.

12. A recording method comprising the step of depositing ink composition onto a recording medium to conduct printing, wherein said ink composition comprises the ink composition of claim 1.

13. An ink jet recording method comprising the step of ejecting and depositing droplets of an ink composition onto a recording medium to conduct printing, wherein said ink composition comprises the ink composition of claim 1.

14. A record produced by the recording method of claim 12.

* * * * *